(12) United States Patent
Oo et al.

(10) Patent No.: US 9,841,938 B2
(45) Date of Patent: Dec. 12, 2017

(54) PIXEL DENSITY NORMALIZATION FOR VIEWING IMAGES ACROSS DISSIMILAR DISPLAYS

(71) Applicant: Nvidia Corporation, Santa Clara, CA (US)

(72) Inventors: Aung Oo, Redmond, WA (US); Rishi Nair, Redmond, WA (US)

(73) Assignee: Nvidia Corporation, Santa Clara, CA (US)

( * ) Notice: Subject to any disclaimer, the term of this patent is extended or adjusted under 35 U.S.C. 154(b) by 156 days.

(21) Appl. No.: 14/717,398

(22) Filed: May 20, 2015

(65) Prior Publication Data

US 2016/0343108 A1    Nov. 24, 2016

(51) Int. Cl.
*G06F 3/14* (2006.01)
*G06T 3/40* (2006.01)

(52) U.S. Cl.
CPC .......... *G06F 3/1446* (2013.01); *G06F 3/1415* (2013.01); *G06F 3/1431* (2013.01); *G06T 3/40* (2013.01); *G09G 2340/04* (2013.01)

(58) Field of Classification Search
CPC .... G06F 3/1446; G06F 3/1431; G06F 3/1415; G06T 3/40; G09G 2340/04
See application file for complete search history.

(56) References Cited

U.S. PATENT DOCUMENTS

| 2008/0079757 | A1* | 4/2008 | Hochmuth | G09G 5/003 |
| | | | | 345/698 |
| 2012/0210263 | A1* | 8/2012 | Perry | G06F 9/4443 |
| | | | | 715/769 |
| 2014/0104137 | A1* | 4/2014 | Brown | G06F 3/1423 |
| | | | | 345/1.1 |
| 2015/0205561 | A1* | 7/2015 | Morton | G06F 3/1423 |
| | | | | 345/1.3 |
| 2015/0268917 | A1* | 9/2015 | Leppanen | G06F 3/1446 |
| | | | | 345/1.3 |

* cited by examiner

*Primary Examiner* — Maurice L McDowell, Jr.
(74) *Attorney, Agent, or Firm* — Kevin Brown; Parker Justiss, P.C.

(57) ABSTRACT

A monitor display system includes a computing device that is coupled to a collection of dissimilar monitors and a display manager that is coupled to the computing device. The display manager has an image generator that generates an image for the collection of dissimilar monitors and also has a pixel density normalizer that is coupled to the image generator and provides an alignment of the image across the collection of dissimilar monitors. A method of managing a display image is also included.

21 Claims, 4 Drawing Sheets

PIXEL DENSITY NORMALIZATION FOR VIEWING IMAGES ACROSS DISSIMILAR DISPLAYS

TECHNICAL FIELD

This application is directed, in general, to image monitoring and more particularly to a display manager, a method of managing a display image and a monitor display system.

BACKGROUND

Video gaming, played on a local gaming device (such as a personal computer), is a rapidly growing commercial field that is receiving a great deal of attention due to its universal interest and appeal. Current "surround" gaming configurations typically require multiple monitors having similar display capabilities, since the pixel density (DPI or PPI) and physical display dimensions may vary on dissimilar displays. If surround gaming is configured using such dissimilar displays, improper alignment of a display image and a disproportional image size will occur across the display. What is needed in the art is an improved way to employ dissimilar monitors for surround display applications.

SUMMARY

Embodiments of the present disclosure provide a display manager, a method of managing a display image and a monitor display system.

In one embodiment, the display manager includes an image generator configured to provide an image for a collection of dissimilar monitors. The display manager additionally includes a pixel density normalizer coupled to the image generator and configured to provide an alignment of the image across the collection of dissimilar monitors.

In another aspect, the method of managing a display image includes generating an image for a collection of dissimilar monitors and providing an alignment of the image across the collection of dissimilar monitors based on pixel density normalization.

In yet another aspect, the monitor display system includes a computing device that is coupled to a collection of dissimilar monitors and a display manager that is coupled to the computing device. The display manager has an image generator that generates an image for the collection of dissimilar monitors and also has a pixel density normalizer that is coupled to the image generator and provides an alignment of the image across the collection of dissimilar monitors.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION

Reference is now made to the following descriptions taken in conjunction with the accompanying drawings, in which.

DETAILED DESCRIPTION

Generally, horizontal and vertical pixel densities (i.e., DPI or PPI) and therefore their corresponding pixel sizes are often different for a computer monitor. Additionally, the horizontal and vertical pixel densities and sizes may also differ monitor to monitor across at least a portion of a collection of dissimilar monitors. Nonalignment of an image displayed across these dissimilar monitors provides image discontinuities across the dissimilar monitors and dislocations at the interfaces or boundaries between the dissimilar monitors due to their having different display sizes and different pixel densities.

Figure 1A:
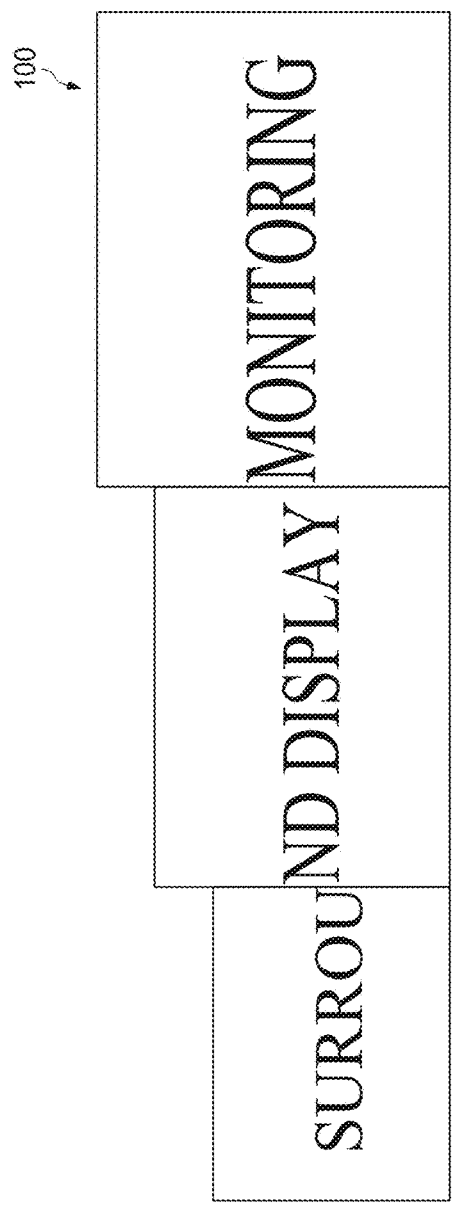
FIGS. 1A and 1B illustrate examples of nonaligned display images that are viewed across a collection of three dissimilar monitors.
Figure 1B:
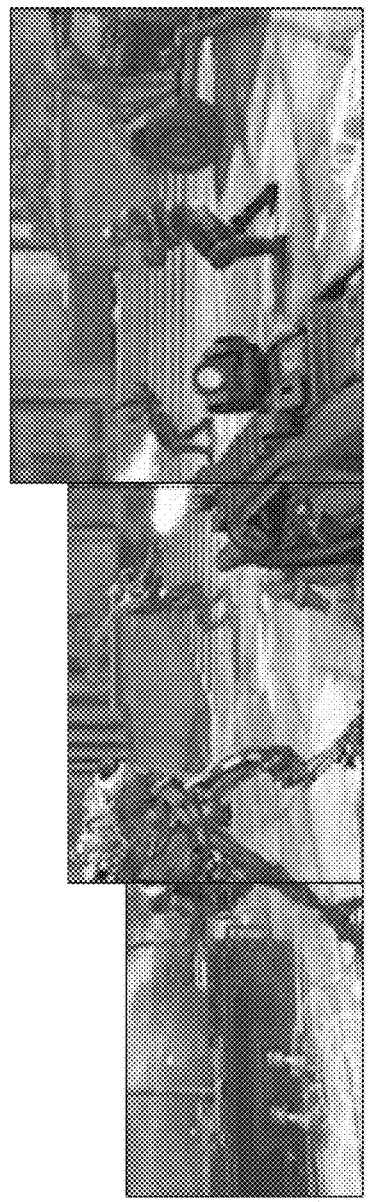

FIGS. 1A and 1B illustrate examples of nonaligned display images, generally designated 100, 150 that are viewed across a collection of three dissimilar monitors. The nonaligned display image 100 portrays a text image showing typical dislocations at monitor boundaries along with changes in text size that are proportional to monitor size. The nonaligned display image 150 portrays a gaming image showing typical dislocations at monitor boundaries along with changes in gaming character sizes that are also proportional to monitor size. These nonaligned display images preclude their use in surround display configurations due to the dislocations and size discrepancies.

Embodiments of the present disclosure employ pixel density normalization for a collection of dissimilar monitors to provide a surround display configuration. For purposes of this disclosure, pixel density normalization of an image defines logical pixel densities (horizontal and vertical) for a logical display area across the dissimilar monitors that provide a proper alignment and sizing of the image across the dissimilar monitors. Generally, the image sizing fills the logical display area and provides a seamless image alignment across respective monitor boundaries.

The logical pixel densities may be different than the physical pixel densities employed in the collection of dissimilar monitors. Alternately, the logical pixel densities may be chosen as the physical pixel densities employed in one of the collection of dissimilar monitors. In one example, the logical pixel densities may be chosen from a monitor having the smallest physical pixel densities (i.e., the largest pixel sizes), where upscaling is used on higher physical pixel density monitors. In another example, the logical pixel densities may be chosen from a monitor having the largest physical pixel densities (i.e., the smallest pixel sizes), where downscaling is used on lower physical pixel density monitors.

Figure 2:
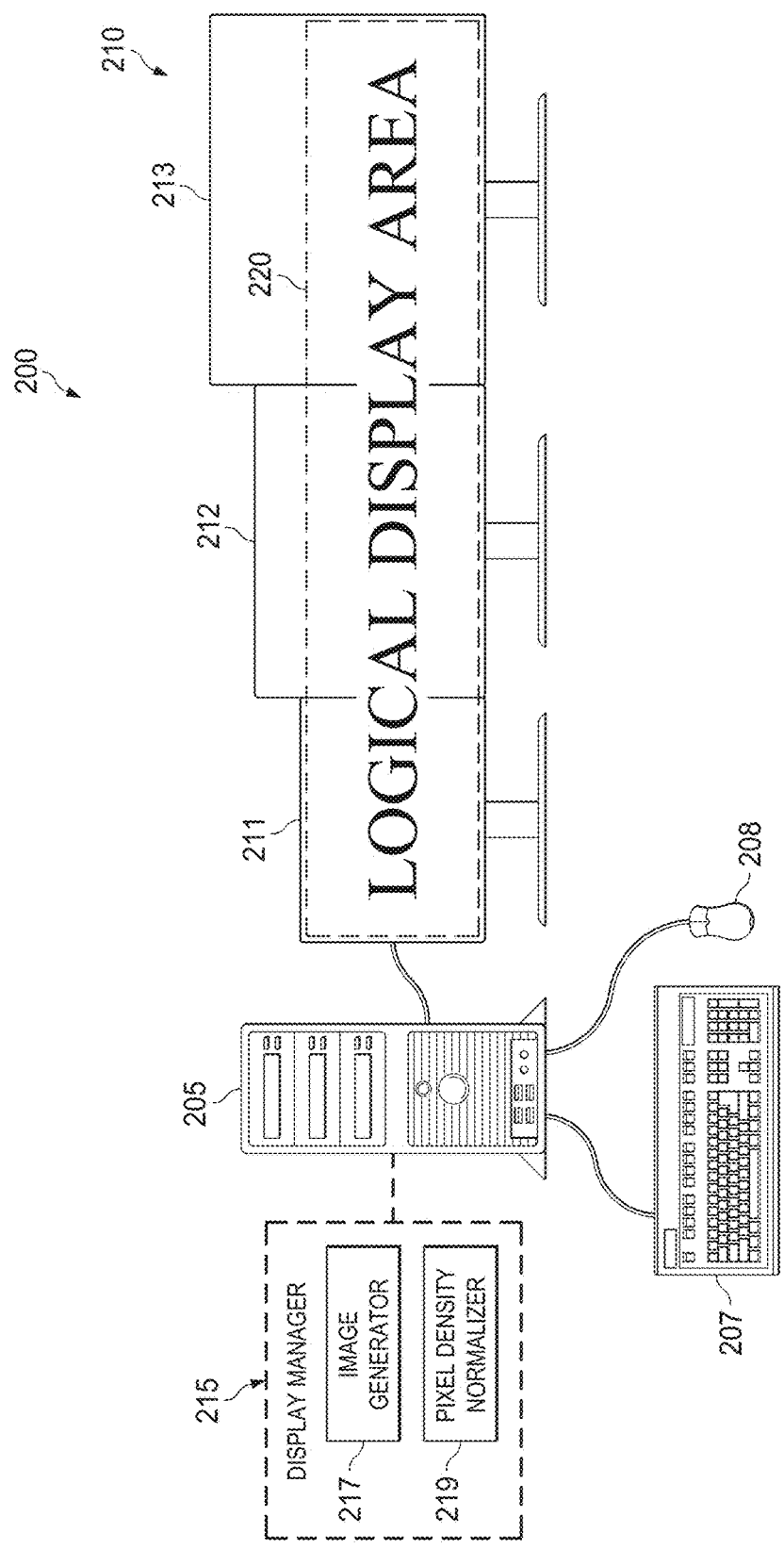
FIG. 2 illustrates an embodiment of a surround monitoring display system constructed according to the principles of the present disclosure.

FIG. 2 illustrates an embodiment of a surround monitoring display system, generally designated 200, constructed according to the principles of the present disclosure. The surround monitoring display system 200 includes a computing device 205 coupled to a collection of dissimilar monitors 210 and a display manager 215. Generally, the surround monitoring display system 200 achieves seamless and improved positioning in any dissimilar multiple monitor setup. In one embodiment, a user may drag an application window across the dissimilar displays (e.g., employing a GPU display scaler) and the application window dimension will appear seamless at the display boundaries and aligned across the displays.

In this embodiment, the computing device 205 is a general purpose computer that employs a keyboard 207 and a mouse 208 as a pointing device. The collection of dissimilar monitors 210 includes first, second and third dissimilar monitors 211, 212, 213. The display manager 215 is coupled to the computing device 205 and includes an image generator 217 and a pixel density normalizer 219. The image generator 217 generates an image for the collection of dissimilar monitors 210, and the pixel density normalizer 219 is coupled to the image generator 217 to provide an alignment of the image across the collection of dissimilar monitors 210 based on pixel density normalization. The alignment of the image is provided in a logical display area 220.

Figure 3A:
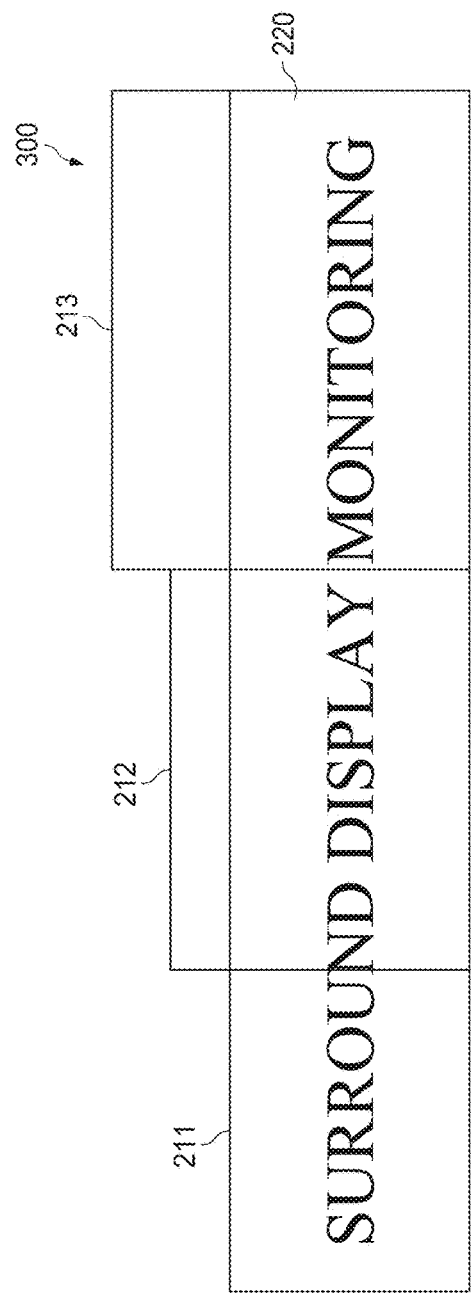
FIGS. 3A and 3B illustrate examples of aligned display images that correspond to surround display images of the nonaligned display images of FIGS. 1A and 1B, as generated in the surround monitoring display system of FIG. 2.
Figure 3B:
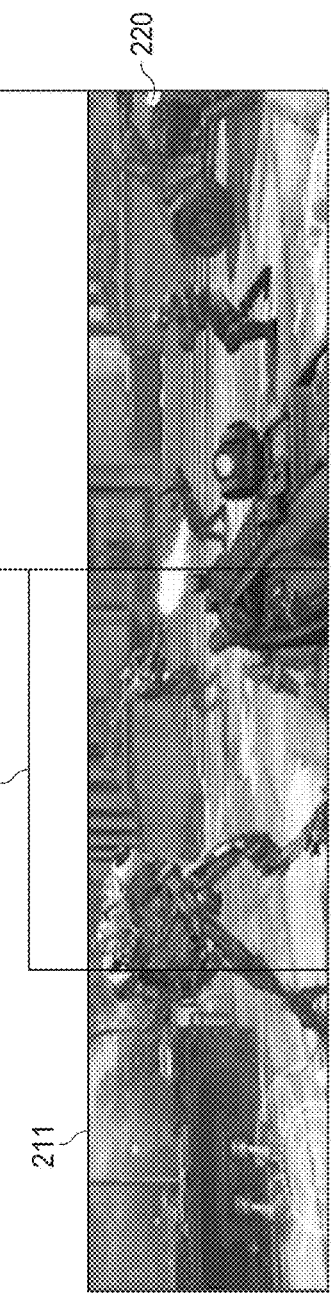

FIGS. 3A and 3B illustrate examples of aligned display images, generally designated 300, 350, that correspond to surround display images of the nonaligned display images 100, 150 of FIGS. 1A and 1B, as generated in the surround monitoring display system 200 of FIG. 2. It may be noted in the surround display images 300, 350 that each is free of image dislocations at monitor boundaries and provides consistent image size across all monitors. The surround display images 300 and 350 are provided in the logical display area 220 defined across the first, second and third dissimilar monitors 211, 212, 213. The top portions of monitors 212, 213 are not employed for display and darkened, in this example.

Figure 4:
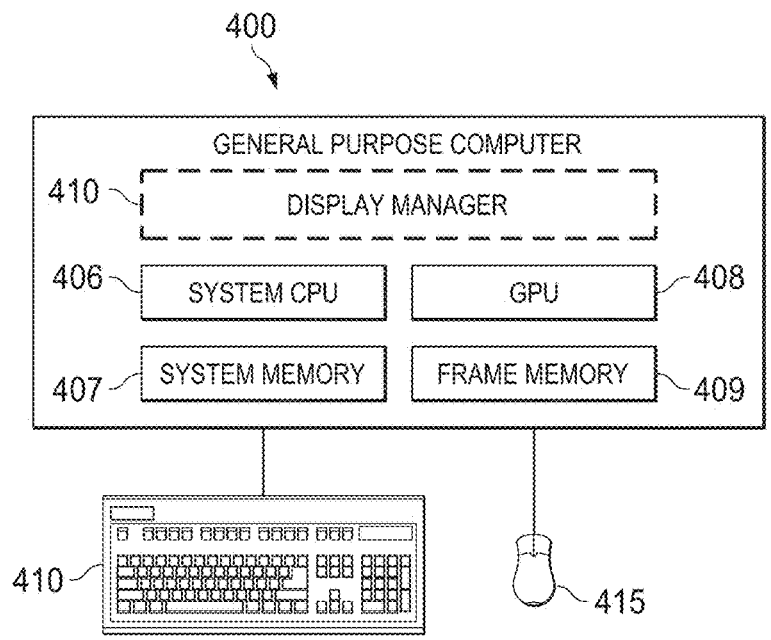
FIG. 4 illustrates a block diagram of an embodiment of a general purpose computer constructed according to the principles of the present disclosure.

FIG. 4 illustrates a block diagram of an embodiment of a general purpose computer, generally designated 400, constructed according to the principles of the present disclosure. The general purpose computer 400 may be employed in a surround monitoring display system, such as that of FIG. 2. The general purpose computer 400 may typically accommodate a wide variety of computer application software including computer gaming applications.

The general purpose computer 400 includes a system central processing unit (CPU) 406, a system memory 407, a graphics processing unit (GPU) 408 and a frame memory 409. The general purpose computer 400 also includes a display manager 410.

The system CPU 406 is coupled to the system memory 407 and the GPU 408 to provide general computing processes and control of operations for the general purpose computer 400. The system memory 407 includes long term memory storage (e.g., a hard drive) for computer applications and random access memory (RAM) to facilitate computation by the system CPU 406. The GPU 408 is further coupled to the frame memory 409 to provide display and frame control information.

The display manager 410 is generally indicated in the general purpose computer 400, and in one embodiment, is embodied in software modules that may correspond to software included with a computer application or software that is independent of the computer application. The display manager 410 may operationally reside in the system memory 407, the frame memory 409 or in portions of both. The display manager 410 may alternately include a hardware portion or be totally implemented in hardware.

Generally, the display manager 410 includes an image generator and a pixel density normalizer that are employed in conjunction with at least a portion of the system CPU 406, the system memory 407, the GPU 408 and the frame memory 409. The image generator directs or supports providing an image for a collection of dissimilar monitors, such as those of FIG. 2. The pixel density normalizer is coupled to the image generator and provides an alignment of the image across the collection of dissimilar monitors based on pixel density normalization.

As noted earlier, pixel density normalization includes defining a logical pixel density (DPI or PPI) and a logical display area for the collection of dissimilar monitors. Consider an example involving a collection of dissimilar monitors as shown in Table 1 below.

TABLE 1

A Collection of Dissimilar Monitors

| Monitor | Physical Dimension (mm) | Physical Pixels | Horizontal Pixel DPI | Vertical Pixel DPI |
|---------|-------------------------|-----------------|----------------------|--------------------|
| M1 | 300 × 220 | 1024 × 768 | 86.70 | 88.67 |
| M2 | 340 × 270 | 1280 × 1024 | 95.62 | 96.33 |
| M3 | 380 × 310 | 1280 × 1024 | 85.56 | 83.90 |

Logical pixel densities (i.e., logical DPIs or PPIs) may be defined with reference to Table 1. The logical DPIs are selected from monitor M3 as 85.56 DPI horizontal and 83.90 DPI vertical, in this example.

Placing the three monitors M1, M2, M3 adjacent to one another allows a logical display area to be defined. With reference to Table 1, the logical display area may be defined horizontally as (300 mm+340 mm+380 mm), which equals 1020 mm. Additionally, the logical display area may be defined vertically as the minimum of (220 mm, 270 mm and 310 mm), which equals 220 mm, as constrained by the monitor M1, in this example. This provides a logical display area of 1020 mm horizontally and 220 mm vertically.

Generally, logical pixel adjusted resolutions (LPARs) may be defined for each of the collection of dissimilar monitors employed, as indicated below.

$$\text{Logical Pixel Adjusted Resolution} = \frac{\text{Monitor Physical Pixels}}{\text{Monitor Physical } DPI} * \text{Logical } DPI.$$

And, the LPARs for the collection of dissimilar monitors defined in Table 1 may be expressed as shown below.

$$LPAR = \left[ \begin{array}{c} \left(\frac{M1 \text{ Physical Pixels}}{M1 \text{ Physical } DPI}\right), \left(\frac{M2 \text{ Physical Pixels}}{M2 \text{ Physical } DPI}\right), \\ \left(\frac{M3 \text{ Physical Pixels}}{M3 \text{ Physical } DPI}\right) \end{array} \right] * \text{Logical } DPI$$

Employing the physical pixel value and pixel DPI for each monitor in Table 1 along with the logical pixel densities selected above (85.56 DPI horizontal and 83.90 DPI vertical) provide the desired monitor LPARs.

Then, $$LPAR\ (M1, M2, M3\ \text{horizontal}) = \left[\left(\frac{1024}{86.70}\right), \left(\frac{1280}{95.62}\right), \left(\frac{1280}{85.56}\right)\right] * 85.56\ \text{pixels},$$

and

LPAR(M1,M2,M3horizontal)=(1010),(1145),(1280) pixels.

Also, $$LPAR\ (M1, M2, M3\ \text{vertical}) = \left[\left(\frac{768}{88.67}\right), \left(\frac{1024}{96.33}\right), \left(\frac{1024}{83.90}\right)\right] * 83.90\ \text{pixels},$$

and

LPAR(M1,M2,M3vertical)=(726),(891),(1024)pixels.

Then, logical pixel and dimension adjusted resolutions (LPDARs) may be defined to fit the logical display area that was defined above (i.e., 1020 mm horizontal and 220 mm vertical).

LPDAR(horizontal)=1010+1145+1280=3435 pixels, and,

LPDAR(vertical)=min[(726),(891),1024]=726 pixels, since the vertical dimension is restricted by monitor M1, in this example. These values are indicated in Table 2 below.

TABLE 2

Pixel and Dimension Adjusted Resolutions

| Monitor | Logical Dimension (mm) | Logical Pixel (DPI) Adjusted Resolutions | Logical Pixel (DPI) and Dimension Adjusted Resolutions |
|---|---|---|---|
| M1 | 300 × 220 | 1010 × 726 | 1010 × 726 |
| M2 | 340 × 220 | 1145 × 891 | 1145 × 726 |
| M3 | 380 × 220 | 1280 × 1024 | 1280 × 726 |

These calculations are conducted in the general purpose computer 400 for application to the collection of dissimilar monitors indicated in Table 1, above.

Figure 5:
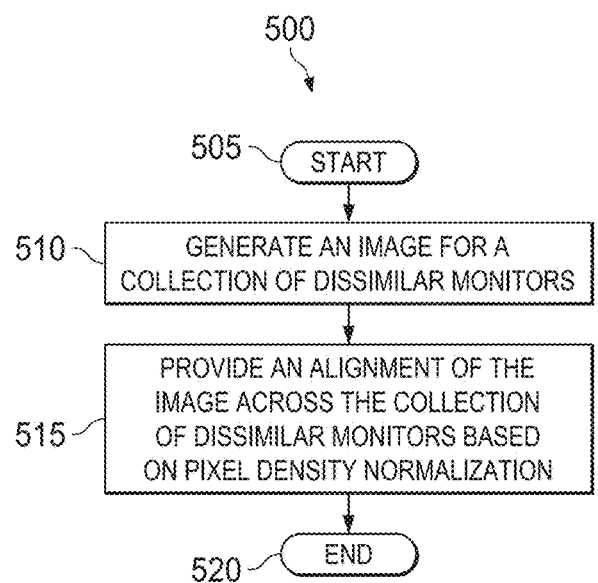
FIG. 5 illustrates a flow diagram of an embodiment of a method of managing a display image carried out according to the principles of the present disclosure.

FIG. 5 illustrates a flow diagram of an embodiment of a method of managing a display image, generally designated 500, carried out according to the principles of the present disclosure. The method 500 starts in a step 505 and an image is generated for a collection of dissimilar monitors in a step 510. Then, in a step 515, an alignment of the image is provided across the collection of dissimilar monitors based on pixel density normalization.

In one embodiment, the alignment of the image is provided in a logical display area of the collection of dissimilar monitors. In another embodiment, the logical display area is physically limited in a first of two orthogonal directions by a summation of individual display dimensions for the collection of dissimilar monitors. Additionally, the logical display area is physically limited in a second of two orthogonal directions by one of the collection of dissimilar monitors.

In yet another embodiment, the alignment of the image employs an orthogonal set of logical pixel densities for the collection of dissimilar monitors. In a further embodiment, logical pixel adjusted resolutions are defined for each of the collection of dissimilar monitors based on the orthogonal set of logical pixel densities. In a still further embodiment, logical pixel and dimension adjusted resolutions are defined for the collection of dissimilar monitors based on the logical pixel adjusted resolutions. The method 500 ends in a step 520.

While the method disclosed herein has been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

What is claimed is:

1. A display manager, comprising:
    a non-transitory computer readable medium having a series of instructions stored thereon that when executed cause a processor to:
    provide an image for a collection of dissimilar monitors; and
    provide an alignment of the image across the collection of dissimilar monitors based on pixel density normalization.

2. The display manager as recited in claim 1 wherein the alignment of the image is provided in a logical display area of the collection of dissimilar monitors.

3. The display manager as recited in claim 2 wherein the logical display area is physically limited in a first of two orthogonal directions by a summation of individual display dimensions for the collection of dissimilar monitors.

4. The display manager as recited in claim 2 wherein the logical display area is physically limited in a second of two orthogonal directions by one of the collection of dissimilar monitors.

5. The display manager as recited in claim 1 wherein the alignment of the image employs an orthogonal set of logical pixel densities for the collection of dissimilar monitors.

6. The display manager as recited in claim 5 wherein logical pixel adjusted resolutions are defined for each of the collection of dissimilar monitors based on the orthogonal set of logical pixel densities.

7. The display manager as recited in claim 6 wherein logical pixel and dimension adjusted resolutions are defined for the collection of dissimilar monitors based on the logical pixel adjusted resolutions.

8. A method of managing a display image, comprising:
    generating an image for a collection of dissimilar monitors; and
    providing an alignment of the image across the collection of dissimilar monitors based on pixel density normalization.

9. The method as recited in claim 8 wherein the alignment of the image is provided in a logical display area of the collection of dissimilar monitors.

10. The method as recited in claim 9 wherein the logical display area is physically limited in a first of two orthogonal directions by a summation of individual display dimensions for the collection of dissimilar monitors.

11. The method as recited in claim 9 wherein the logical display area is physically limited in a second of two orthogonal directions by one of the collection of dissimilar monitors.

12. The method as recited in claim 8 wherein the alignment of the image employs an orthogonal set of logical pixel densities for the collection of dissimilar monitors.

13. The method as recited in claim 12 wherein logical pixel adjusted resolutions are defined for each of the collection of dissimilar monitors based on the orthogonal set of logical pixel densities.

14. The method as recited in claim 13 wherein logical pixel and dimension adjusted resolutions are defined for the collection of dissimilar monitors based on the logical pixel adjusted resolutions.

15. A monitor display system, comprising:
   a computing device coupled to a collection of dissimilar monitors; and
   a display manager, coupled to the computing device, including:
      an image generator that generates an image for the collection of dissimilar monitors, and
      a pixel density normalizer that is coupled to the image generator and provides an alignment of the image across the collection of dissimilar monitors based on pixel density normalization.

16. The system as recited in claim 15 wherein the alignment of the image is provided in a logical display area of the collection of dissimilar monitors.

17. The system as recited in claim 16 wherein the logical display area is physically limited in a first of two orthogonal directions by a summation of individual display dimensions for the collection of dissimilar monitors.

18. The system as recited in claim 16 wherein the logical display area is physically limited in a second of two orthogonal directions by one of the collection of dissimilar monitors.

19. The system as recited in claim 15 wherein the alignment of the image employs an orthogonal set of logical pixel densities for the collection of dissimilar monitors.

20. The system as recited in claim 19 wherein logical pixel adjusted resolutions are defined for each of the collection of dissimilar monitors based on the orthogonal set of logical pixel densities, and logical pixel and dimension adjusted resolutions are defined for the collection of dissimilar monitors based on the logical pixel adjusted resolutions.

21. A hardware display manager, comprising:
   an image generator configured to provide an image for a collection of dissimilar monitors; and
   a pixel density normalizer coupled to the image generator and configured to provide an alignment of the image across the collection of dissimilar monitors based on pixel density normalization, wherein at least one of the image generator and the pixel density normalizer are implemented in hardware.

* * * * *